(12) United States Patent
Kim et al.

(10) Patent No.: US 7,742,657 B2
(45) Date of Patent: Jun. 22, 2010

(54) METHOD FOR SYNTHESIZING INTERMEDIATE IMAGE USING MESH BASED ON MULTI-VIEW SQUARE CAMERA STRUCTURE AND DEVICE USING THE SAME AND COMPUTER-READABLE MEDIUM HAVING THEREON PROGRAM PERFORMING FUNCTION EMBODYING THE SAME

(75) Inventors: Tae-Wan Kim, Sungnam (KR); Byeong-Ho Choi, Yongin (KR); Je-Woo Kim, Seoul (KR); Hyok Song, Sungnam (KR)

(73) Assignee: Korea Electronics Technology Institute, Sungnam-si (KR)

( * ) Notice: Subject to any disclaimer, the term of this patent is extended or adjusted under 35 U.S.C. 154(b) by 1251 days.

(21) Appl. No.: 11/281,389

(22) Filed: Nov. 18, 2005

(65) Prior Publication Data

US 2007/0086645 A1 Apr. 19, 2007

(30) Foreign Application Priority Data

Oct. 18, 2005 (KR) ...................... 10-2005-0098033

(51) Int. Cl.
*G06K 9/36* (2006.01)
(52) U.S. Cl. ...................... 382/284; 382/154; 382/276; 345/419; 345/421
(58) Field of Classification Search ................. 382/154, 382/276, 284; 245/419, 421; 345/419, 421
See application file for complete search history.

(56) References Cited

U.S. PATENT DOCUMENTS

| | | | | |
|---|---|---|---|---|
| 5,710,875 | A * | 1/1998 | Harashima et al. | 345/419 |
| 5,721,624 | A * | 2/1998 | Kumashiro et al. | 358/450 |
| 6,078,701 | A * | 6/2000 | Hsu et al. | 382/294 |
| 6,084,979 | A * | 7/2000 | Kanade et al. | 382/154 |
| 6,198,852 | B1 * | 3/2001 | Anandan et al. | 382/284 |
| 6,473,536 | B1 * | 10/2002 | Chiba et al. | 382/284 |
| 6,657,667 | B1 * | 12/2003 | Anderson | 348/333.12 |
| 6,668,082 | B1 * | 12/2003 | Davison et al. | 382/190 |
| 7,015,954 | B1 * | 3/2006 | Foote et al. | 348/218.1 |
| 7,277,118 | B2 * | 10/2007 | Foote | 348/36 |

* cited by examiner

*Primary Examiner*—Matthew C Bella
*Assistant Examiner*—Eric Rush
(74) *Attorney, Agent, or Firm*—Sughrue Mion, PLLC

(57) ABSTRACT

The present invention relates to an intermediate image synthesizing method using a mesh based on a multi-view square camera structure.

In accordance with the present invention, an accurate disparity vector may be obtained since a shared area is searched for a predetermined time interval using a distance matching and a synthesized image is generated for each area based thereon, an occlusion region is reduced by using three reference images, the synthesized image may be easily generated even for an image having a large disparity, and a converted outline may be accurately expressed, and a high three-dimensional effect may be represented due to the image conversion through the mesh based on a vertex of the outline.

32 Claims, 10 Drawing Sheets (PRIOR ART)

[FIG. 2]
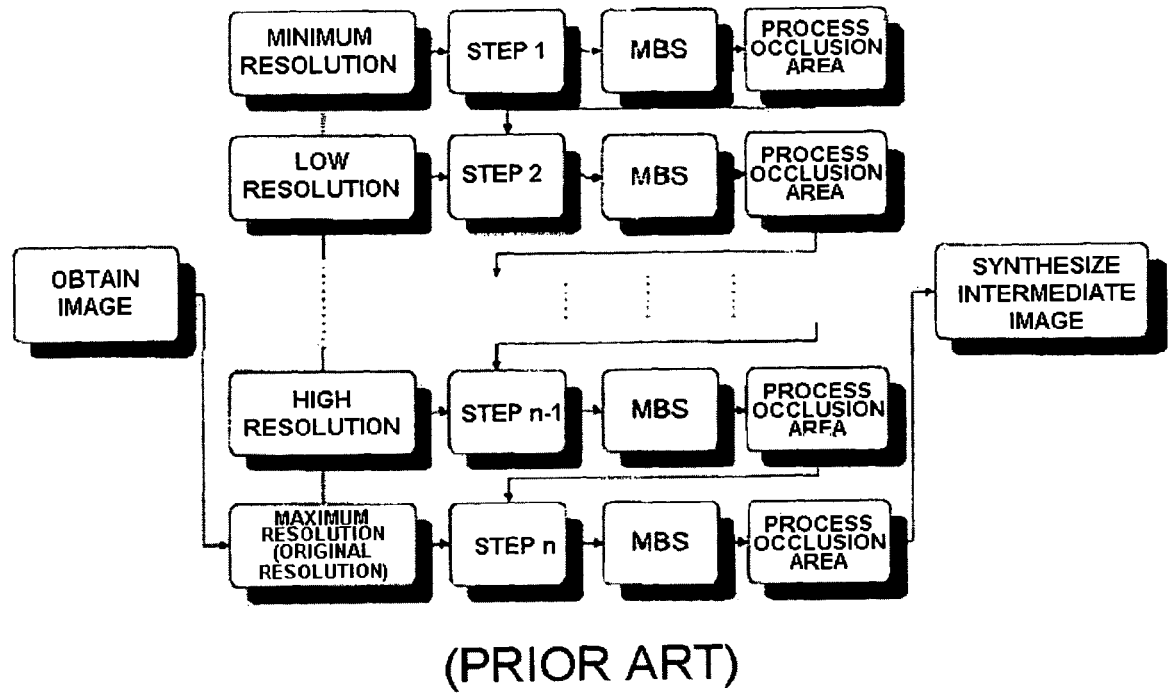
(PRIOR ART)

[FIG. 3]
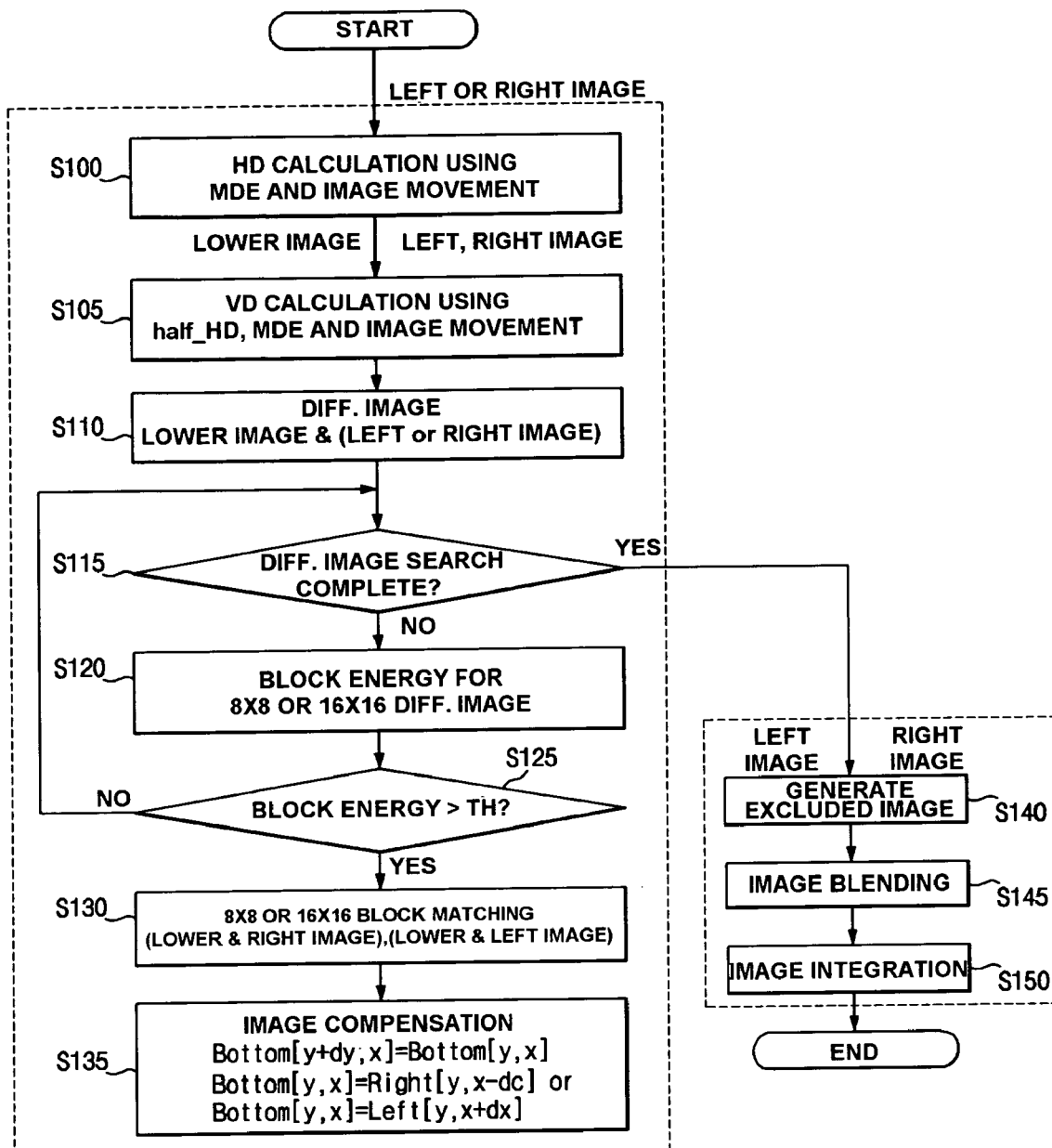
(PRIOR ART)

[FIG. 4]
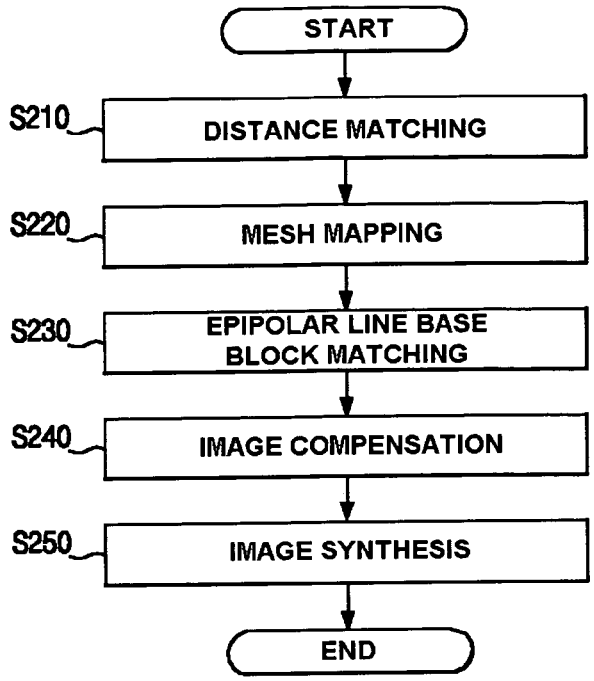
[FIG. 5a]
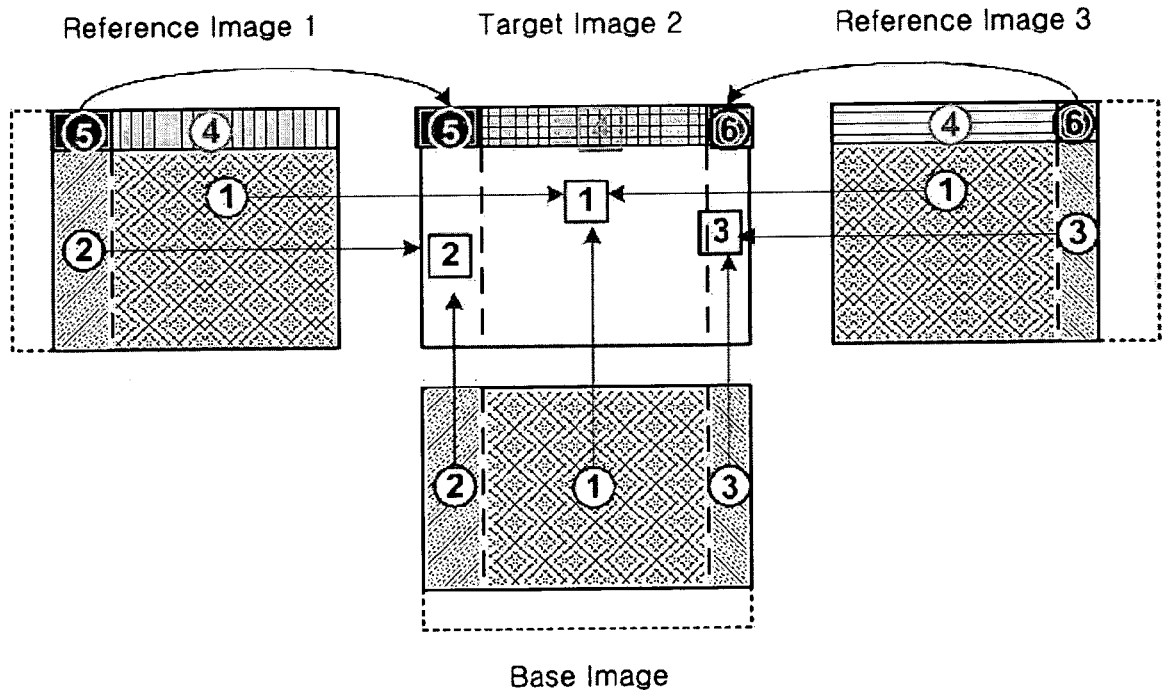

[FIG. 5b]
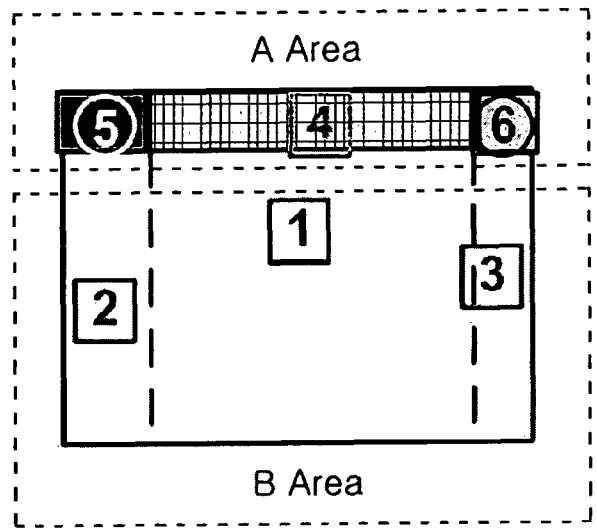
[FIG. 6]
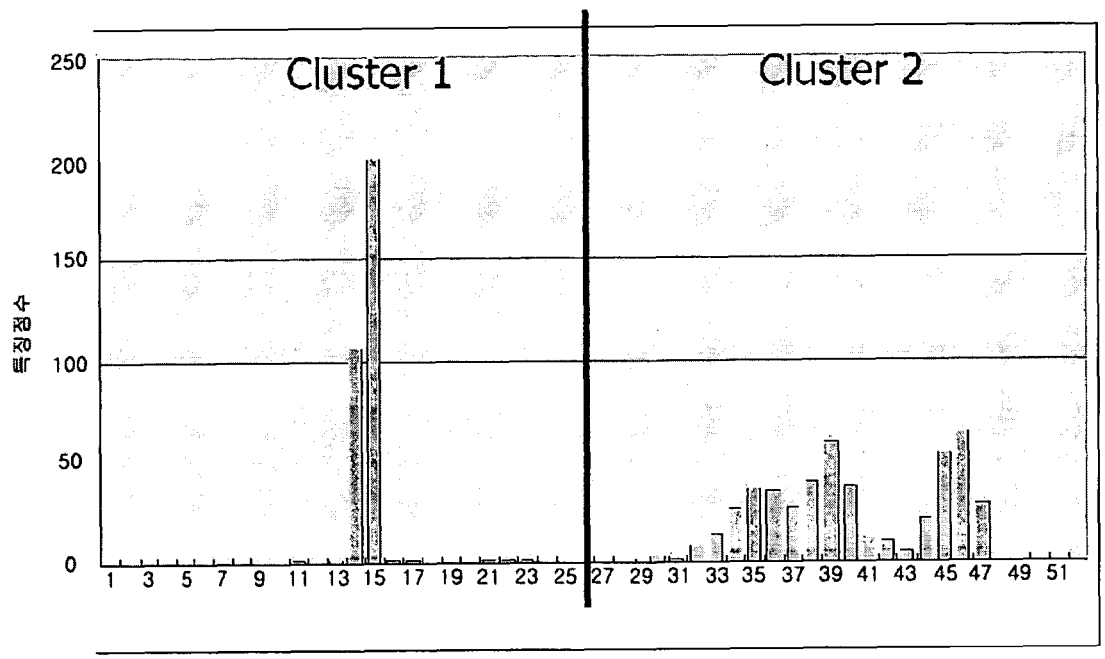

METHOD FOR SYNTHESIZING INTERMEDIATE IMAGE USING MESH BASED ON MULTI-VIEW SQUARE CAMERA STRUCTURE AND DEVICE USING THE SAME AND COMPUTER-READABLE MEDIUM HAVING THEREON PROGRAM PERFORMING FUNCTION EMBODYING THE SAME

RELATED APPLICATIONS

The present disclosure relates to subject matter contained in priority Korean Application No. 10-2005-0098033 filed on 18 Oct. 2005, which is herein expressly incorporated by reference in its entirety.

BACKGROUND OF THE INVENTION

1. Field of the Invention

The present invention relates to a method for synthesizing intermediate image using mesh based on multi-view square camera structure and a device using the same and a computer-readable medium having thereon program performing function embodying the same, and more particularly, to a method for synthesizing intermediate image using mesh based on multi-view square camera structure and a device using the same and a computer-readable medium having thereon program performing function embodying the same wherein an accurate disparity vector may be obtained since a shared area is searched for a predetermined time interval using a distance matching and a synthesized image is generated for each area based thereon, an occlusion region is reduced by using three reference images, the synthesized image may be easily generated even for an image having a large disparity, and a converted outline may be accurately expressed, and a high three-dimensional effect may be represented due to the image conversion through the mesh based on a vertex of the outline.

2. Description of the Related Art

A research for a three-dimensional television which is a next generation display of a HDTV is being carried out. A method using a disparity of both eyes has been proposed as an initial type of the 3D television. While the method somewhat provides a three-dimensional effect for an observer, the method does not provide a sufficient vivid motion and reality as in a person seeing an actual object. In order to overcome such disadvantage, a method wherein a more vivid three-dimensional image is displayed using a multi-view image obtained by two or more cameras is under a research.

A moving picture stream used for a multi-view image processing is generally obtained using one camera per view. As an arrangement for a multi-view camera, a parallel arrangement of an in-line type camera, a radical camera arrangement, and the like are available. However, in case of the radical camera arrangement, a distortion of view may occur when a multi-view image obtained from different cameras is displayed on a single screen. The problem may be solved by a parallel camera arrangement method. However, the parallel camera arrangement is disadvantageous in that it is difficult to display a three dimensional effect in a vertical direction. Therefore, a research on a signal processing and a display device employing a square camera arrangement is being carried out recently.

In order to embody a multi-view video system for the 3D television, a transmitter transmits an image obtained from cameras having various arrangements, and a receiver carries out a display based on a transmitted data. In order to transmit the multi-view video through one broadcast channel, a much higher compression ratio is required compared to a compression ratio for a single-view video in video compression. However, it is virtually impossible to transmit an entire multi-view image using a conventional compression algorithm through a conventional broadcast channel. Therefore, an intermediate image synthesis wherein only images the number of which is allowed by the channel are transmitted and the receiver generates a view of image which is not transmitted based on the transmitted image instead of transmitting then entire view of image is under research.

In order to extract a vertex, a feature based method based on a likelihood model, a block based method, a method using a mesh are mainly used as an algorithm related to the intermediate image synthesis. In addition, a method using a depth map is employed. As an example of these algorithms, there are "Multi-view Video System and an Image Generation Method for a 3D Image" disclosed by Korean Patent Application No. 10-2000-0063753 (herein referred to as "Reference 1"), and "Method for Extracting Dense Depth Information using Multiple Camera Input Images and Method for Intermediate Image Synthesis Using the Same" disclosed by Korean Patent Application No. 10-2000-0005297 (herein referred to as "Reference 2"), and these are applied to an application system such as "3D Catalog Shopping System and Method" disclosed by Korean Patent Application No. 10-1995-0042335.

FIG. 1 is a block diagram illustrating a decompression means 34 and an intermediate image synthesizing means 35 disclosed in Reference 1.

In accordance with Reference 1, a method wherein a number of (N–M) images are newly generated between a number of M view-point images obtained in a 3D system using a number of N parallel multi-view images to finally obtain the number of N view-point images is disclosed. For such, an adaptive point extractor 63, and an occlusion region generator 64 for compensating an occlusion region between reference images based on an extracted adaptive point data are used.

Specifically, as shown, nine view-point images are restored in the video decompression means 34 to be input to the intermediate image generating means 35. The intermediate image generating means 35 performs an adaptive point extraction for reference images $0v1$, $0v2$, $0v4$, $0v6$, $0v7$ and $0v9$ from reference images $0v2$, $0v4$, $0v5$, $0v6$ and $0v8$ in the adaptive point extractor 63, and then extracts and generates the occlusion region based on an adaptive point extraction data in the occlusion region generator 64. Thereafter, a data corresponding to the adaptive point and an interpolated occlusion region are integrated to generate a new intermediate image, thereby obtaining seventeen view-points.

FIG. 2 is a diagram illustrating a conventional MR-MBS (Multi-Resolution Multiple Baseline Stereo) method for synthesizing an intermediate image disclosed by Reference 2.

In accordance with the MR-MBS method of FIG. 2, a depth information of each pixel is densely extracted from images obtained from a finite number of cameras placed in multiple position to generate an intermediate image using this wherein MBS method is converted to a multi-resolution.

Referring to FIG. 2, an input image obtained from multiple cameras with respect to a single object is decomposed into the multi-resolution, and an image having a minimum resolution is subjected to the MBS and the occlusion region process to obtain a depth information of a pixel of the object (step 1) so as to be transmitted to a step 2 wherein a high resolution process is performed. In the step 2, multiple pixels of a high resolution corresponding to a single pixel of a low resolution is subjected to the MR-MBS and the occlusion region process based on the transmitted pixel information to obtain a depth information of the multiple pixels. The process is repeated until a maximum resolution to accurately obtain the depth information for each pixel of the object and the intermediate image.

However, in accordance with the conventional intermediate image synthesizing method, it is difficult to synthesize the intermediate image because the occlusion region is largely generated when a distance between base-lines is large or an angle or a distance between cameras is increased. Moreover, since the adaptive point extractor is applied to an entire object, an unnecessary depth map information and an excessive adaptive point data may be generated.

For example, in accordance with Reference 1, when an intervening image between a left and a right images is synthesized based on a view-point image transmitted from a transmitter in the parallel camera arrangement, a distance between the referred left and the right images are quite increased as a distance of the base-line is slightly increased. As a result, in the synthesis of the intermediate image, the occlusion region is largely increased and the occlusion region cannot be completely compensated using only the adaptive point extractor. Moreover, since the adaptive point extractor is applied to the entire object, an excessive simulation time is required.

In accordance with Reference 2, while problems of a processing time for the MBS and an extension of a boundary line in the depth map are solved by the multi-resolution method employing multiple cameras placed in arbitrary position, the resolution of each pixel and an accurate depth map cannot be obtained when the position and the angle between the cameras are increased. Moreover, in accordance the method, a long simulation time is required due to the unnecessary depth map since the depth map is generated through every camera for the single object and a necessary intermediate image is generated.

In order to overcome the problems, Korean Patent Application No. 10-2004-116703 (not published) filed by the applicant disclose a technology wherein an intermediate image which is not transmitted from a transmitter is synthesized in a receiver using a distance matching, a block matching and an image blending.

FIG. 3 is a flow chart illustrating a conventional method for synthesizing an intermediate image from a portion of a multi-view image based on a multi-view square camera arrangement in accordance with Korean Patent Application No. 10-2004-116703.

As shown in FIG. 3, the method for synthesizing the intermediate image from the portion of the multi-view image based on the multi-view square camera arrangement in accordance with Korean Patent Application No. 10-2004-116703 comprises steps of distance-matching for identifying an overlapping area where an intermediate image to be synthesized and neighboring three reference images overlap (S100 through S110), block-matching wherein a block matching is carried out for a block where a differential image between the reference images in the overlapping area exists (S115 through S130), image-compensation wherein an image of the overlapping area is compensated according to a result of the block matching (S135); and image-synthesizing wherein the intermediate image is synthesized by integrating the compensated image of the overlapping area.

However, Korean Patent Application No. 10-2004-116703 is disadvantageous in that an operation time for obtaining the distance matching is very long and accuracy is low. In addition, each block overlaps when a disparity is obtained from the three images only through the block matching and the image compensation is performed. Moreover, when various algorithms are applied only to an area having a large disparity, it is difficult to maintain an object and a background in the image.

The present invention overcomes the disadvantages of Korean Patent Application No. 10-2004-116703 wherein only the block matching is used for the intermediate image synthesis by perceiving that a more effective 3D image is obtained when outlines of the object and the background are matched based on a mesh.

SUMMARY OF THE INVENTION

It is an object of the present invention to provide a method for synthesizing intermediate image using mesh based on multi-view square camera structure and a device using the same and a computer-readable medium having thereon program performing function embodying the same wherein an accurate disparity vector may be obtained since a shared area is searched for a predetermined time interval using a distance matching and a synthesized image is generated for each area based thereon, an occlusion region is reduced by using three reference images, the synthesized image may be easily generated even for an image having a large disparity, and a converted outline may be accurately expressed, and a high three-dimensional effect may be represented due to the image conversion through the mesh based on a vertex of the outline.

In order to achieve the above-described objects of the present invention, there is provided a intermediate image synthesizing method using a mesh based on a multi-view square camera structure, the method comprising steps of: matching distance wherein an overlapping area where an intermediate image to be synthesized and three reference images adjacent to the intermediate image overlap is identified; mesh-mapping wherein a vertex is extracted based on a outline of an object by considering a position characteristic of a difference obtained according to the overlapping area to construct the mesh; block-matching based on an epipolar line to obtain a disparity vector with respect to the vertex wherein a block matching is by carried out by a unit of a predetermined block designated on the epipolar line having the extracted vertex as a center; image-compensating for compensating an image of the overlapping area wherein an image conversion and an image deformation is performed based on the reference images according to a result of the block matching; and image-synthesizing for synthesizing the intermediate image by integrating the compensated image of the overlapping area.

In order to achieve the above-described objects of the present invention, there is also provided an intermediate image-synthesizing device using a mesh based on a multi-view square camera structure, the device comprising: distance matching means for identifying an overlapping area where an intermediate image to be synthesized and three reference images adjacent to the intermediate image overlap; mesh-mapping means for extracting a vertex based on a outline of an object by considering a position characteristic of a difference obtained according to the overlapping area to construct the mesh; block-matching means based on an epipolar line for obtaining a disparity vector with respect to the vertex wherein a block matching is by carried out by a unit of a predetermined block designated on the epipolar line having the extracted vertex as a center; image-compensating means for compensating an image of the overlapping area wherein an image conversion and an image deformation is performed based on the reference images according to a result of the block matching; and image-synthesizing means for synthesizing the intermediate image by integrating the compensated image of the overlapping area.

In order to achieve the above-described objects of the present invention, there is also provided a computer-readable medium having thereon a program performing function of embodying an intermediate image synthesis using mesh based on multi-view square camera structure, the program performing functions of: matching distance wherein an overlapping area where an intermediate image to be synthesized and three reference images adjacent to the intermediate image overlap is identified; mesh-mapping wherein a vertex is extracted based on a outline of an object by considering a position characteristic of a difference obtained according to the overlapping area to construct the mesh; block-matching based on an epipolar line to obtain a disparity vector with respect to the vertex wherein a block matching is by carried out by a unit of a predetermined block designated on the epipolar line having the extracted vertex as a center; image-compensating for compensating an image of the overlapping area wherein an image conversion and an image deformation is performed based on the reference images according to a result of the block matching; and image-synthesizing for synthesizing the intermediate image by integrating the compensated image of the overlapping area.

BRIEF DESCRIPTION OF THE DRAWINGS

FIG. 2 is a diagram illustrating a conventional MR-MBS (Multi-Resolution Multiple Baseline Stereo) method for synthesizing an intermediate image.

FIG. 3 is a flow chart illustrating a conventional method for synthesizing an intermediate image.

FIG. 4 is a flow chart illustrating a method for synthesizing intermediate images using mesh based on multi-view square camera structure in accordance with the present invention.

FIGS. 5a and 5b are diagrams exemplifying a division for an intermediate image synthesis in accordance with a preferred embodiment of the present invention.

FIG. 6 is a graph illustrating the number of vertex according to disparity of an experimental image in accordance with a method for synthesizing intermediate images using mesh based on multi-view square camera structure of the present invention.

DETAILED DESCRIPTION OF THE INVENTION

Figure 1:
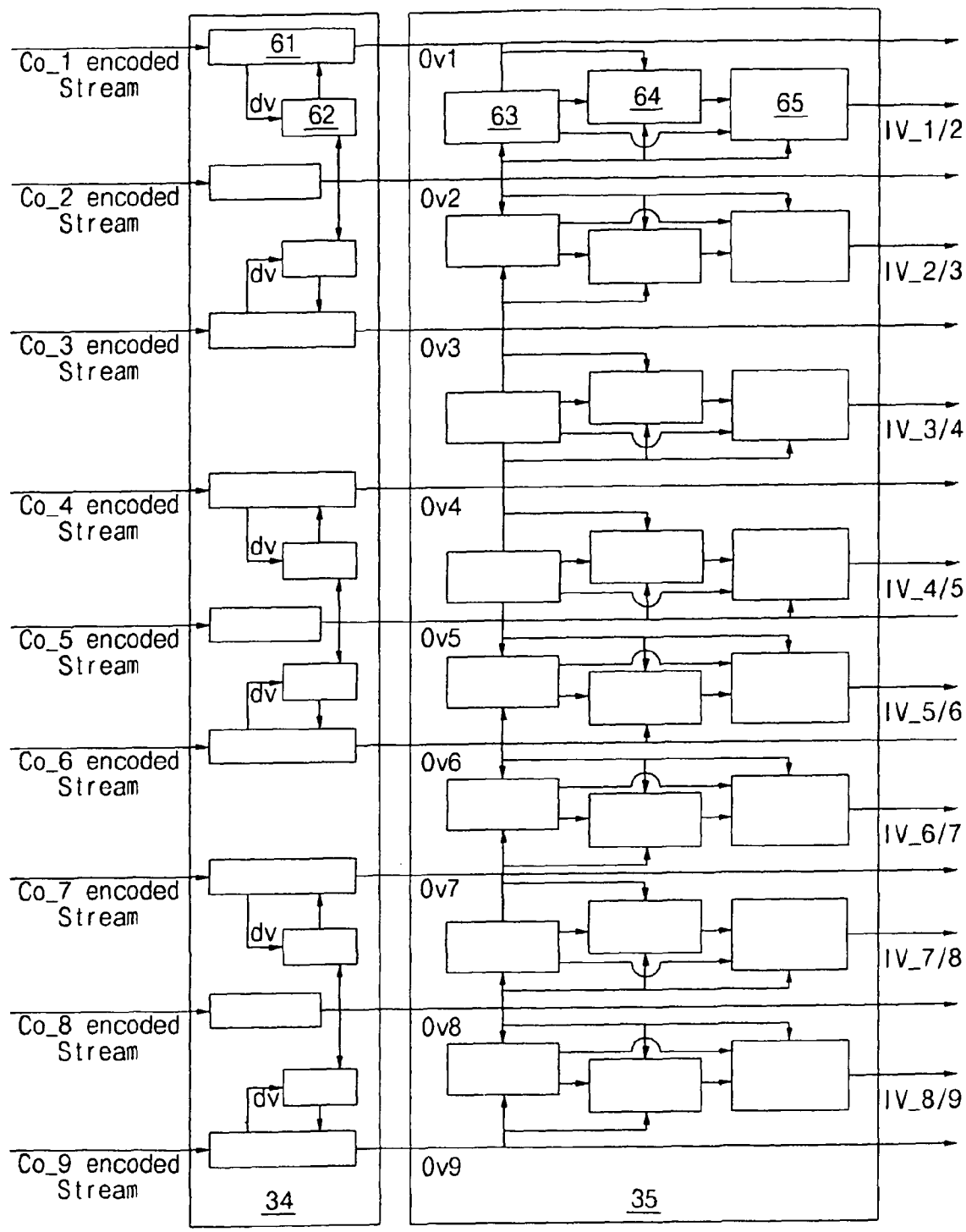
FIG. 1 is a block diagram illustrating a conventional intermediate image synthesizing device.

A method for synthesizing intermediate image using mesh based on multi-view square camera structure and device using the same and computer-readable medium having thereon a program performing function embodying the same in accordance with the present invention will now be described in detail with reference to the accompanied drawings.

FIG. 4 is a flow chart illustrating a method for synthesizing an intermediate image using a mesh based on a multi-view square camera structure in accordance with the present invention.

As shown, the method for synthesizing an intermediate images using a mesh based on a multi-view square camera structure in accordance with the present invention comprises a distance-matching step S210, a mesh-mapping step S220, a epipolar line base block-matching step S230, a image-compensating step S240 and a image-synthesizing step S250.

In the distance-matching step S210, an overlapping area where an intermediate image to be synthesized and three reference images adjacent to the intermediate image overlap is identified.

In the mesh-mapping step S220, a vertex is extracted based on an outline of an object by considering a position characteristic of a difference obtained according to the overlapping area to construct the mesh.

In the epipolar base block-matching step S230, a block matching is by carried out by a unit of a predetermined block designated on an epipolar line having the extracted vertex as a center to obtain a disparity vector with respect to the vertex.

In the image-compensating step S240, an image conversion and an image deformation is performed based on the reference images according to a result of the block matching to compensate an image of the overlapping area.

In the image-synthesizing step S250 the compensated image of the overlapping area is integrated to synthesize the intermediate image.

FIGS. 5a and 5b are diagrams exemplifying a division for an intermediate image synthesis in accordance with a preferred embodiment of the present invention. As shown in FIG. 5, a target image denotes an intermediate image synthesized in accordance with the present invention, a reference image 1, a reference image 2 and a base image denote three reference images used for synthesizing the target image.

As shown in FIG. 5, an area Ⓘ of the target image corresponds to an area ① of the reference images and three reference images, i.e. the base image, the reference image 1 and the reference image 2 are applied to synthesize the area Ⓘ.

Areas Ⓘ and Ⓘ of the target image correspond to areas ② and ③ of the reference images and two reference images, i.e. the base image and one of the reference images 1 and 2 are applied to synthesize the area Ⓘ.

An area Ⓘ of the target image is synthesized from an area ④ of the reference images 1 and 2. Areas ⑤ and ⑥ of the target image only exist in areas ⑤ and ⑥ of the reference images 1 and 2 which are used as is.

As described above, when an area consisting of the areas Ⓘ, Ⓘ and Ⓘ of the target image and an area B consisting of the areas Ⓘ, ⑤ and ⑥ are synthesized, the areas A and B are integrated and an image blending is applied to synthesize a final target image, i.e. the intermediate image.

In accordance with description, the intermediate image is hereinafter referred to as the target image, the reference images (base image, reference image 1, reference image 2) are hereinafter referred to a lower image ($I_B$), a left image ($I_L$) and a right image ($I_R$).

The steps of the present invention are described in detail below.

(1) The Distance Matching Step

The distance matching step is a step wherein the overlapping area where a predicted target image and three reference images overlap is identified.

An example configuration of the distance matching is, for example, disclosed in Korean Patent Application No. the RSDS timing controller 102004-116703.

Referring to FIGS. 3 and 5a, in the step S100, as one of the reference images 1 and 2 of FIG. 5a is moved horizontally in parallel by a unit of one pixel having the other reference image as a center, a MDE (Minimum distance Error), for example a MADE (Minimum Average Distance Error) is applied. As a result, a horizontal distance (hereinafter referred to as "HD") at which an average error sum is minimized is obtained.

Thereafter, in the step S105, a half-HD which is one half of the HD is obtained from HD obtained in S100 to predict a position of the intermediate image (the target image of FIG. 5a). That is, the base image is moved in a vertical direction by a unit of one pixel VD on a basis of an image obtained by moving one of the reference images 1 and 2 in parallel by a distance of the half-HD to obtain a vertical distance (hereinafter referred to as "VD") at which the average error sum is minimized by the MDE.

Next, in the step S110, an overlapping area is determined by referring to the VD and HD, and a differential image is obtained in each overlapping area accordingly. That is, when the base image is vertically moved by a distance of the VD on the basis of the image obtained by moving one of the reference images 1 and 2 in parallel by the distance of the half-HD, the are is divided according to mutual overlapping among the reference images.

For example, in case of FIG. 5a, the areas ①, ② and ③ are overlapping (shared) areas where the differential image is generated between at least one of the reference images 1 and 2 and the base image, and overlap the areas ⓘ, ⓘ and ⓘ of the intermediate image. The area ④ is an overlapping area of the reference images 1 and 2, and overlaps the area ⓘ of the intermediate image. The areas ⑤ and ⑥ of the intermediate image uniquely exist in the reference images 1 and 2 of the reference images, respectively.

The exemplified configuration of the distance matching step is identical to that of the Korean Patent Application No. the RSDS timing controller 102004-116703. However, while a complexity of the distance matching method through the pixel movement is relatively low, a speed and an accuracy are low, therefore in a trade-off relationship.

Therefore, a FFT (Fast Fourier Transform) may be used instead of the pixel movement in the distance matching method. That is, the FFT may be carried out for each reference image to identify the overlapping region when the intermediate image is synthesized.

(2) The Mesh-Mapping Step

In order to synthesize each region of the target image, a reference should be made from the reference images. Since a generally used block-matching, for example, a reference through a block-matching described in Korean Patent Application 102004-116703 is a reference through a comparison of pixel values, it is difficult to synthesize an accurate outline and shape.

In order to compensate for this disadvantage, a main vertex of the outline is obtained and then a block matching is performed based on the vertex to refer to the reference images, thereby obtaining a more accurate intermediate image.

The mesh-mapping step is for obtaining the main vertex and may be divided into a step of extracting the vertex and a step of forming the mesh.

(a) The Vertex Extracting Step

In order to refer to the reference images through the vertex extraction, an outline which represents the object in the image should be extracted.

The outline extraction, in case of the Area B in FIG. 5 for example, may be carried out by subjecting the base image to an algorithm such as a Canny edge detection or a Sobel edge detection algorithm.

The extraction of the vertex in the edge is performed by repeatedly scanning the reference image while varying a size of a window such as a 16 by 16 window or an 8 by 8 window until only a single vertex exists in the window. Alternately, for an edge detected using a Canny edge operator, a pixel at which a pixel value starts to change may be detected as the vertex.

When the vertex is obtained, in some cases, a plurality of the vertex may be very close to one another or the edge is not accurately represented. Therefore, in this case, an offset of a distance between the windows may be varied to extract the vertex.

In case of the area A of FIG. 5b, the reference image 1 or the reference image 2 may be subjected to the outline extraction. The description below will be focused on the area B of FIG. 5b.

(b) The Mesh Forming Step

The mesh may be formed for the reference image of each area, i.e. the base image, the reference image 1 or the reference image 2 using the vertex obtained through the vertex extraction.

For example, Delaunay triangular mesh may be formed.

(3) The Epipolar Line Based Block Matching Step

In order to synthesize the target image, for the area B for example, a corresponding point should be extracted form the reference images 1 and 2 through a block matching on a basis of the vertex extracted from the base image. The epipolar line based block matching step is for obtaining a disparity vector by extracting the corresponding point.

The corresponding point of each reference images in a general multi-view image exist on an epipolar line expressed in epipolar geometry or an area adjacent thereto.

In addition, an epipolar line for every point in an image is parallel to a direction of a translation vector of the entire image. Since the translation vector of the entire image may be known from a distance matching obtained in the distance matching step, the epipolar line for each corresponding points may be represented as parallel to the distance matching vector.

A corresponding point for an overlapping portion between two images is searched on the epipolar line or the adjacent region thereto.

The detection of the corresponding point for the reference images is performed by a block matching method wherein a block having a predetermined size B is designated and then the corresponding point is detected using an MAE (Mean Absolute Error).

Equation 1 is for obtaining the MAE between the base image and the reference image 1.

$$\sum_{(x,y)\in B} |I_B(x, y) - I_L(x + d_x, y + d_y)| \qquad \text{[Equation 1]}$$

Referring to FIG. 5a, the areas ①, ②, and ③ are synthesized by referring to the reference images 1 and 2 on a basis of the areas ①, ②, ③.

In case of the vertex of the area ② of the base image, a disparity vector $D_L(d_x, d_y)$ is varied along the epipolar line while the MAE between the reference image 1 and the base image is obtained. A point at which the calculated MAE value is minimum is the corresponding point of the reference image 1 for the vertex of area ② of the base image, and the disparity vector $D_L(d_x, d_y)$ at this point is the disparity vector for the vertex.

A position of the block for obtaining the vertex and the corresponding point may be limited by considering a relationship in each area.

For example, in view of the position, since the vertex of area ② of the base image exists in a down-right direction in the reference image 1, the area for extraction may be limited to the diagonal down-right direction of the reference image 1 to reduce an operation time for the corresponding point extraction.

In this manner, a disparity vector $D_R(d_x, d_y)$ may be defined for other area of the base image and the reference image 2.

Similarly, since the vertex of area ③ of the base image exists in a down-left direction in the reference image 2, the area for extraction may be limited to the diagonal down-left direction of the reference image 2 to reduce an operation time for the corresponding point extraction.

The area ① exists both in the reference images 1 and 2. Therefore, the disparity vectors $D_L$ and $D_R$ are obtained respectively.

Since the reference images 1 and 2 are a stereo image, i.e. parallel to each other, with respect to the vertex in the area ①, the disparity vectors $D_L$ and $D_R$ have the same value. Therefore, when a difference between dy values of the disparity vectors $D_L$ and $D_R$ exceeds a predetermined critical value, this may be defined as an error to delete the vertex and the corresponding point.

When the difference is within the predetermined critical value, dy is defined as Equation 2 in order to make the dy of the two disparity vectors identical.

$$dy = [D_L(dy) + D_R(dy)]/2 \quad \text{[Equation 2]}$$

Through such a disparity compensation, an error for a non-overlapping area and overlapping area between the reference images may be reduced and a more accurate disparity vector may be obtained.

For example, the disparity may be obtained through a relationship between the reference images 1 and 2 for the non-overlapping area with the base image.

The area ④ of the target image only exists in the reference images 1 and 2, and since the two referred images, i.e. reference images 1 and 2 are in a stereo image relationship, all of the disparity vectors are parallel to an x axis. Therefore, the disparity vector may be obtained by applying the block matching on the epipolar line along a direction parallel to the x axis and the adjacent region for the vertex extracted with respect to the area A.

(4) The Image-Compensating Step

The image-compensating step is for performing an image deformation or an image conversion in order to synthesize the intermediate image and for compensating a continuity and a discontinuity in order to generate a viewpoint interpolated image.

The image-compensating step comprises a resetting step of the disparity vector through an affine conversion, a mesh clustering step and a hole filling step.

(a) The Affine Conversion Step

In case of the area B of FIG. 5b for example, in order to synthesize the target image using the disparity vector obtained from the base image by referring to the reference images 1 and 2, the image deformation/image conversion should be performed. In case of synthesizing the intermediate image, a relationship between the reference images (the base image, the reference images 1 and 2) and the target image is not only the image conversion but also an image alteration relationship wherein a shape of the object varies according to the viewpoint with respect to the object.

Therefore, the Affine transform may be applied in order to synthesize each region of the target image.

The disparity vector is obtained by referring to the areas ①, ② and ③ of the reference images 1 and 2 on a basis of the area ①, ② and ③ of the base image, and then the areas ①, ② and ③ of the target image is obtained using the disparity vector through the Affine conversion.

In addition, the area ④ of the target image is synthesized through the affine conversion using the disparity vector obtained by referring to the area ④ of the reference image 1 on a basis of the area ④ of the reference image 1.

Equation 3 represents a relationship between a converted coordinate (u, v) and a pixel (x, y) in a triangle of the mesh of the original image prior to the conversion.

$$\begin{pmatrix} u(x,y) \\ v(x,y) \end{pmatrix} = \begin{pmatrix} a_1 \\ a_4 \end{pmatrix} + \begin{pmatrix} a_2 & a_3 \\ a_5 & a_6 \end{pmatrix} \begin{pmatrix} x \\ y \end{pmatrix}, \quad \text{[Equation 3]}$$

where $a_1$ through $a_6$ are parameters according to the conversion.

Therefore, since the converted coordinate (u, v) with respect to the pixel (x, y) in the triangle of the mesh of the original image is known in an actual embodiment, a position of the pixel corresponding to an inside of the converted triangle is obtained from the original image when an inverse transform matrix is obtained through the (u, v) and the disparity vector value obtained through the block matching so that the disparity vector value is readjusted. When a pixel value is fetched from the triangle of the original image, the disparity vector which is readjusted by a unit of the triangular mesh is fetched by applying a scan line algorithm.

(b) The Mesh-Clustering Step

An important issue for generating the view-point interpolated image in an image synthesis based on a multi-view square camera structure is to accurately represent a continuity and a discontinuity of the disparity.

The disparity should be continuously represented for a pixel in a certain object in the image and the disparity a boundary between two objects should be discontinuously represented.

In addition, a process for an occlusion region should be solved. The occlusion region refers to an area which can be seen in an image of one view but cannot be seen in the image from another view. Particularly, the discontinuity should be properly processed to process the occlusion region which is a key problem in the viewpoint interpolated image.

A method for constituting a disparity map or generating viewpoint interpolated image by building a triangular network based on the vertex may represent the continuity of the disparity very well, but has a problem in representing the discontinuity and processing the occlusion region.

In accordance with the convention research, the entire image is configured to be a single mesh network to synthesize the intermediate image through the image deformation resulting in a problem of a blurring about the boundary of the object. The mesh clustering is a method wherein the mesh which constitutes the image is classified according to a size of the disparity to be processed separately.

FIG. 6 illustrates the number of the vertex according to the disparity dy of an experimental image. As shown in FIG. 6, the mesh may be divided into two clusters based on the disparity 26.

That is, the mesh having a disparity smaller than 26 is classified as a first cluster group, and the mesh having a disparity larger than 26 is classified as a second cluster group. The shown critical value 26 differs according to the experimental image and the number of cluster groups may be adjusted according to a disparity distribution.

In accordance with the mesh clustering method, the object is not divided. Therefore, case when multiple objects exist continuously may be classified as a single cluster while a single object may be classified as multiple clusters.

In this case, when the entire disparities of the three points belong to one of the clusters, the corresponding mesh may be classified as corresponding cluster. However, when each of the three points belong to different clusters, it should be determined that the corresponding mesh should be classified as which cluster.

Figure 7:
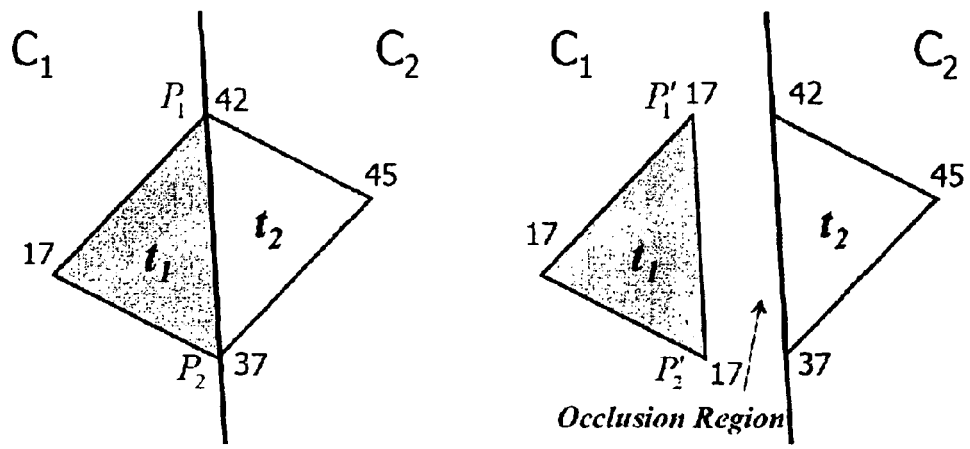
FIG. 7 is a diagram illustrating a cluster crystal in accordance with a method for synthesizing intermediate images using mesh based on multi-view square camera structure of the present invention.

FIG. 7 illustrates such determination of cluster.

An area $C_1$ denotes an area having a small disparity and an area $C_2$ denotes an area having a large disparity in FIG. 7. As shown in FIG. 7, a mesh $t_1$ and a mesh $t_2$ is disposed on a boundary between two areas, and $P_1$ and $P_2$ are vertexes on a segment wherein each of the disparities radically changes. Therefore, it is preferable that the vertexes $P_1$ and $P_2$ have the disparity of the area $C_1$ in view of the mesh $t_1$, and the disparity of the area $C_2$ in view of the mesh $t_2$. That is, the disparity has a dual property at the vertexes $P_1$ and $P_2$. An actual disparity in the occlusion region of the vertex appears to be the disparity in the area $C_2$ which have a higher disparity as shown in (b) of FIG. 7. This is because the boundary is determined by the object having the higher disparity, i.e. by the object that projects more.

Therefore, the mesh consisting of the vertex belonging to different clusters may be classified into clusters having lower disparity.

After such classification of the clusters, the disparity of the vertexes $P_1$ and $P_2$ showing the dual property of disparity is reset as shown in (b) of FIG. 7.

That is, the disparity of the vertexes $P_1$ and $P_2$ of the mesh $t_2$ belonging to the $C_2$ is set to the disparity value that has already been obtained, and the disparity of the vertexes $P_1$ and $P_2$ of the mesh $t_1$ belonging to the $C_1$ is obtained by Equation 4.

$$\begin{cases} \text{if } \min[D(p), D(q), D(r)] \in C_1, & t(p, q, r) \in C_1 \\ \text{if } \min[D(p), D(q), D(r)] \in C_2, & t(p, q, r) \in C_2 \end{cases}$$ [Equation 4]

$$\begin{cases} \text{if } n = 1, D(q) = D(p) \text{ and} & (p \in C_1, q, r \in C_2) \\ \quad D(r) = D(p) & \\ \text{if } n = 2, D(r) = [D(p) + D(q)]/2 & (p, q \in C_1, r \in C_2) \end{cases},$$

where n is the number of the mesh t belonging to $C_1$.

(c) The Hole Filling Step

Generally, a large disparity occurs between multiple objects, and an occlusion occurs due to an area having the large disparity between each of the disparities.

Figure 8:
FIG. 8 is a diagram illustrating phenomenon of a hole generation in accordance with a method for synthesizing intermediate images using mesh based on multi-view square camera structure of the present invention.

In addition, due to a disparity between mesh clusters, a hole is generated as a result of a conversion as shown in FIG. 8, resulting in a phenomenon wherein a hole area and the occlusion region is identical.

Therefore, the hole area may be regarded as the occlusion region so that the hole area in the left of the cluster may be regarded to exist only in the reference image 1 and the hole area in the right of the cluster may be regarded to exist only in the reference image 2.

In this case, for a vertex of a triangle at the boundary where the two clusters divides, since the entire vertex is not included in the cluster, the vertex at the boundary is obtained based on this characteristic.

Of the obtained vertex on the boundary, an initial vertex is obtained and is sequentially aligned along the mesh in the object to perform a contour vertex clustering by dividing into left and right. The FIG. 9 illustrates the vertex after performing the contour vertex clustering.

Figure 9A:
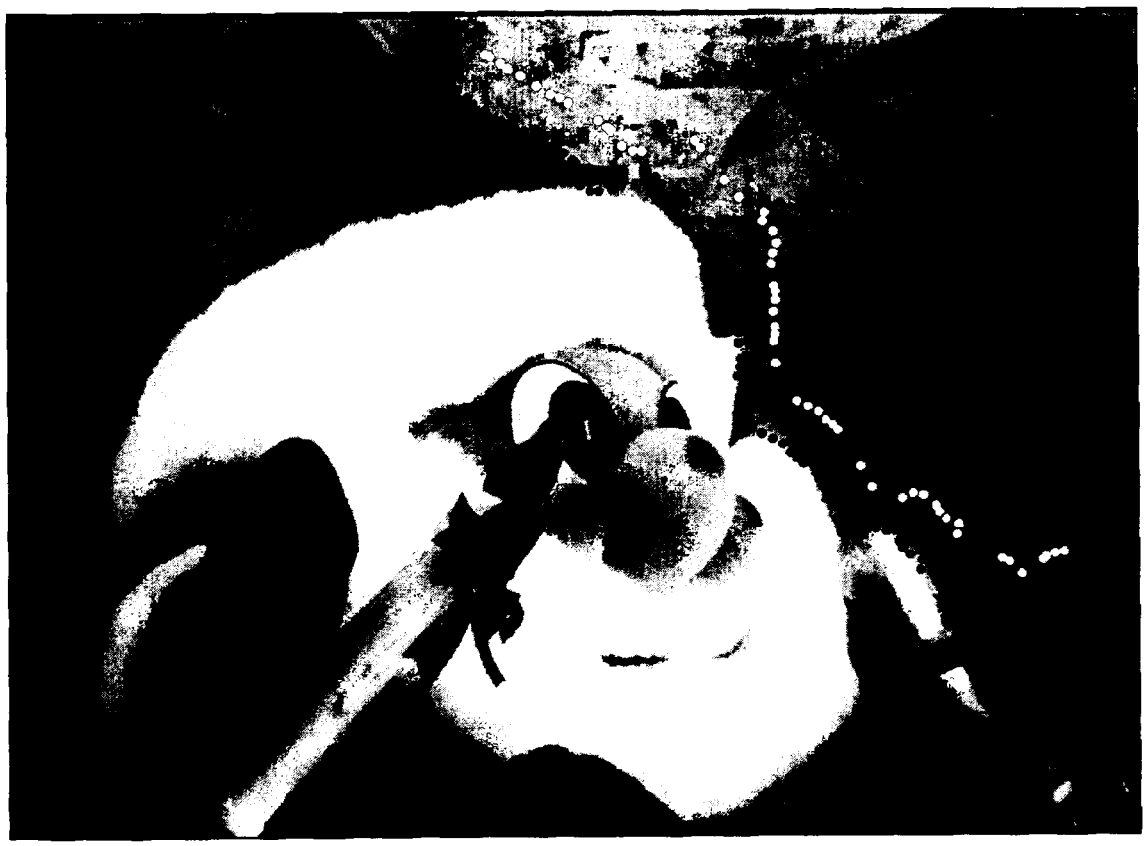
FIG. 9 is diagram illustrating a vertex after performing a contour vertex clustering in accordance with a method for synthesizing intermediate images using mesh based on multi-view square camera structure of the present invention.
Figure 9B:

(a) of FIG. 9 illustrates the vertex in an area at the right of the boundary as a white dot and the vertex prior to the conversion corresponding thereto as a black dot placed on the reference image 2, and (b) of FIG. 9 illustrates the vertexes at the right of the boundary placed in the reference image 1.

As shown in (a) and (b) of FIG. 9, a regular triangular mesh is formed in an area between the black dot and the white dot, and the area is obtained and fetched from the reference regions 1 and 2. Therefore, a filling of the hole area and a compensation for the occlusion region is simultaneously achieved.

Figure 10A:
FIG. 10 is a diagram illustrating a regular triangular mesh exclusive of a portion of the triangular meshes through a validity evaluation of the regular triangular mesh in accordance with a method for synthesizing intermediate images using mesh based on multi-view square camera structure of the present invention.
Figure 10B:

However, in case of a complex area, a phenomenon wherein the triangles overlap occurs when the regular triangular mesh is formed. Therefore, the proposed algorithm is complemented in that only the triangles which do not overlap with each other selected through a validity evaluation of the regular triangular mesh are subjected to a formation and a conversion of the regular triangular mesh. FIG. 10 is a diagram illustrating a regular triangular mesh exclusive of a portion of the triangular meshes through a validity evaluation of the regular triangular mesh. That is, (a) of FIG. 10 illustrates a contour regular triangular mesh with respect to the reference image 2 and (a) of FIG. 10 illustrates a contour regular triangular mesh with respect to the reference image 1.

While the image-compensating step has been described with reference to the area B of FIG. 5b, the area A of FIG. 5a is also subjected to the image-compensating step.

(5) The Image-Synthesizing Step

The image-synthesizing step is for synthesizing the intermediate image by integrating the compensated overlapping area. That is, the areas A and B of FIG. 5b are subjected to an image blending and then integrated to synthesize the intermediate image. A detailed description of the image blending is omitted.

As described above, the intermediate image synthesizing method using a mesh based on a multi-view square camera structure in accordance with the present invention may be applied to a case where a minimum image is transmitted for an embodiment of a 3D TV broadcast through a limited size channel. That is, the image that is not transmitted may be synthesized in real time using the intermediate image synthesizing method in accordance with the present invention.

In addition, the intermediate image synthesizing method in accordance with the present invention employs a process wherein the disparity vector is obtained using the epipolar line based block matching based on the vertex by identifying the overlapping area through the distance matching and considering the position characteristic of the difference appearing according to the reference image. Therefore, the method may be applied to the multi-view compression algorithm using the disparity vector.

On the other hand, a description of an intermediate image-synthesizing device using a mesh based on a multi-view square camera structure, and a computer-readable medium having thereon a program performing function of embodying an intermediate image synthesis using mesh based on multi-view square camera structure in accordance with the present invention is a duplicate of the intermediate image synthesizing method in accordance with the present invention. Therefore, the description is omitted.

While the present invention has been particularly shown and described with reference to the preferred embodiment thereof, it will be understood by those skilled in the art that various changes in form and details may be effected therein without departing from the spirit and scope of the invention as defined by the appended claims. While the left/right/lower images are exemplified in the preferred embodiment of the present invention, the same applies to, upper/lower/right images or upper/lower/left images for example according to the position of the intermediate image to be synthesized. Therefore, the scope of the present invention should be determined by the appended claims.

As described above, in accordance with the present invention, an accurate disparity vector may be obtained since a shared area is searched for a predetermined time interval using the distance matching and the synthesized image is generated for each area based on this, the occlusion region is reduced by using three reference images, the synthesized image may be easily generated even for an image having a large disparity, and the converted outline may be accurately expressed and a high three-dimensional effect may be represented due to the image conversion through the mesh based on the vertex of the outline.

What is claimed:

1. An intermediate image synthesizing method using a mesh based on a multi-view square camera structure, the method comprising:

performing distance-matching in which an overlapping area where an intermediate image to be synthesized and three reference images adjacent to the intermediate image overlap is identified;

performing mesh-mapping in which a vertex is extracted based on an outline of an object by considering a position characteristic of a difference obtained according to the overlapping area, and the mesh is constructed using the vertex;

performing block-matching based on an epipolar line to obtain a disparity vector with respect to the vertex, the block-matching being carried out by a unit of a predetermined block designated on the epipolar line having the vertex as a center;

performing image-compensating for compensating an image of the overlapping area in which an image conversion and an image deformation is performed based on the reference images according to a result of the block-matching; and performing image-synthesizing for synthesizing the intermediate image by integrating the compensated image of the overlapping area, wherein the performing mesh-mapping comprises:
      detecting the outline of the object in one of the reference images;
      extracting the vertex in the detected outline by scanning the one of the reference images adjacent to the outline by a window having a predetermined size so that a single vertex exists in the window; and
      forming the mesh with respect to the one of the reference images based on the extracted vertex.

2. The method in accordance with claim 1, wherein the performing distance matching comprises:
   calculating a distance HD between two parallel reference images of the three reference images by a parallel translation and a minimum mean differential error;
   determining a position of the intermediate image by moving the two parallel reference images by one half of the distance HD and calculating a distance VD between the intermediate and a remaining reference image of the three reference images by the parallel translation, a vertical translation and the minimum mean differential error; and
   moving the two reference images by one half of the distance HD and the remaining reference image by the distance VD to identify the overlapping area where the intermediate image and the three reference images adjacent to the intermediate image overlap.

3. The method in accordance with claim 1, wherein the performing distance-matching identifies the overlapping area using a Fast Fourier Transform.

4. The method in accordance with claim 1, wherein the detecting the outline is performed using a Canny edge operator or a Sobel edge operator.

5. The method in accordance with claim 1, wherein the extracting the vertex comprises, when more than two vertices exist or the outline is not indicated, varying the size of the window or an offset of a distance between the window and another window so that the single vertex exists in the window to extract the vertex.

6. The method in accordance with claim 1, wherein the mesh is a Delaunay triangular mesh.

7. The method in accordance with claim 1, wherein the performing block-matching comprises:
   designating a block having a predetermined size on the epipolar line for an extraction of a corresponding point with respect to the reference images;
   calculating a mean absolute error between the reference images with respect to the block;
   setting a point where the mean absolute error is minimized to a corresponding point with respect to the vertex; and
   obtaining the disparity vector based on the vertex and the corresponding point with respect to the vertex.

8. The method in accordance with claim 7, wherein the performing block-matching further comprises limiting a position of the block by considering a relationship between the vertex and the corresponding point.

9. The method in accordance with claim 7, wherein the performing block-matching further comprises:
   determining whether a difference between y component values of the disparity vector of the vertex is less than a predetermined critical value with respect to two reference images of the reference images which are stereo images with respect to the overlapping area referring to the three reference images;
   deleting the vertex and the corresponding point corresponding to the vertex when the difference between the y component values is equal to or more than the critical value; and
   averaging the y component values of the disparity vector when the difference between the y component values is less than the critical value to conform.

10. The method in accordance with claim 7, wherein the performing block-matching further comprises applying the block matching along an area adjacent to an x-axis and a direction parallel thereto with respect to the overlapping area referring to the two reference images which are a stereo image of the reference images.

11. The method in accordance with claim 1, wherein the performing image-compensating comprises respectively generating the overlapping area of the intermediate image through an affine conversion.

12. The method in accordance with claim 1, wherein the performing image-compensating comprises resetting a disparity by clustering a disparity value of the vertex in the mesh on a basis of a predetermined critical value and detecting an occlusion region.

13. The method in accordance with claim 1, wherein the performing image-compensating comprises:
 calculating the vertex converted during generation of the overlapping area with respect to the vertex of the mesh wherein a hole is generated for the overlapping area of the intermediate image;
 forming a regular triangle mesh area with respect to the vertex of the mesh wherein the hole is generated and the converted vertex of the intermediate image; and
 obtaining an image with respect to the regular triangle mesh area from the reference image to be added to the regular triangle mesh area of the overlapping area.

14. The method in accordance with claim 1, wherein the performing image-compensating comprises carrying out an image blending for a boundary line of the overlapping area.

15. An intermediate image-synthesizing device using a mesh based on a multi-view square camera structure, the device comprising:
 distance-matching means for identifying an overlapping area where an intermediate image to be synthesized and three reference images adjacent to the intermediate image overlap;
 mesh-mapping means for extracting a vertex based on an outline of an object by considering a position characteristic of a difference obtained according to the overlapping area to construct the mesh;
 block-matching means for performing block-matching based on an epipolar line for obtaining a disparity vector with respect to the vertex, the block-matching being carried out by a unit of a predetermined block designated on the epipolar line having the vertex as a center;
 image-compensating means for compensating an image of the overlapping area in which an image conversion and an image deformation is performed based on the reference images according to a result of the block-matching; and
 image-synthesizing means for synthesizing the intermediate image by integrating the compensated image of the overlapping area,
 wherein the mesh-mapping means performs:
  detecting the outline of the object in one of the reference images;
  extracting the vertex in the detected outline by scanning the one of the reference images adjacent to the outline by a window having a predetermined size so that a single vertex exists in the window; and
  forming the mesh with respect to the one of the reference images based on the extracted vertex.

16. The device in accordance with claim 15, wherein the distance matching means comprises:
 calculating means for calculating a distance HD between two parallel reference images of the three reference images by a parallel translation and a minimum mean differential error;
 determining means for determining a position of the intermediate image by moving the two parallel reference images by one half of the distance HD and calculating a distance VD between the intermediate and a remaining reference image of the three reference images by the parallel translation, a vertical translation and the minimum mean differential error; and
 moving means for moving the two reference images by one half of the distance HD and the remaining reference image by the distance VD to identify the overlapping area where the intermediate image and the three reference images adjacent to the intermediate image overlap.

17. The device in accordance with claim 15, wherein the distance matching means identifies the overlapping area using a Fast Fourier Transform.

18. The device in accordance claim 16, wherein the detecting means detects the outline by using a Canny edge operator or a Sobel edge operator.

19. The device in accordance with claim 15, wherein the extracting means varies, when more than two vertices exist or the outline is not indicated, the size of the window or an offset of a distance between the window and another window so that the single vertex exists in the window to extract the vertex.

20. The device in accordance with claim 15, the mesh is a Delaunay triangular mesh.

21. The device in accordance with claim 15, wherein the block-matching means performs:
 designating a block having a predetermined size on the epipolar line for an extraction of a corresponding point with respect to the reference images;
 calculating a mean absolute error between the reference images with respect to the block;
 setting a point where the mean absolute error is minimized to a corresponding point with respect to the vertex; and
 obtaining the disparity vector based on the vertex and the corresponding point with respect to the vertex.

22. The device in accordance with claim 21, wherein the block-matching means farther limits a position of the block by considering a relationship between the vertex and the corresponding point.

23. The device in accordance with claim 21, wherein the block-matching means performs:
 determining whether a difference between y component values of the disparity vector of the vertex is less than a predetermined critical value with respect to two reference images of the reference images which are stereo images with respect to the overlapping area referring to the three reference images;
 deleting the vertex and the corresponding point corresponding to the vertex when the difference between the y component values is equal to or more than the critical value; and
 calculating an average of the y component values of the disparity vector when the difference between the y component values is less than the critical value to conform.

24. The device in accordance with claim 21, wherein the block-matching means limitedly applies the block matching along an area adjacent to an x-axis and a direction parallel thereto with respect to the overlapping area referring to the two reference images which are a stereo image of the reference images.

25. The device in accordance with claim 15, wherein the image-compensating means respectively generates the overlapping area of the intermediate image through an affine conversion.

26. The device in accordance with claim 15, wherein the image-compensating means resets a disparity by clustering a disparity value of the vertex in the mesh on a basis of a predetermined critical value and detecting an occlusion region.

27. The device in accordance with claim 15, wherein the image-compensating means performs:
    calculating the vertex converted during generation of the overlapping area with respect to the vertex of the mesh wherein a hole is generated for the overlapping area of the intermediate image; forms a regular triangle mesh area with respect to the vertex of the mesh wherein the hole is generated and the converted vertex of the intermediate image; and btains an image with respect to the regular triangle mesh area from the reference image to be added to the regular triangle mesh area of the overlapping area.

28. The device in accordance with claim 15, wherein the image-compensating means carries out an image blending for a boundary line of the overlapping area.

29. A computer-readable medium having thereon a program performing function of embodying an intermediate image synthesis using mesh based on multi-view square camera structure, the program performing functions of:
    performing distance-matching in which an overlapping area where an intermediate image to be synthesized and three reference images adjacent to the intermediate image overlap is identified;
    performing mesh-mapping in which a vertex is extracted based on an outline of an object by considering a position characteristic of a difference obtained according to the overlapping area, and the mesh is constructed using the vertex;
    performing block-matching based on an epipolar line to obtain a disparity vector with respect to the vertex, the block-matching being carried out by a unit of a predetermined block designated on the epipolar line having the vertex as a center;
    performing image-compensating for compensating an image of the overlapping area in which an image conversion and an image deformation is performed based on the reference images according to a result of the block-matching; and
    performing image-synthesizing for synthesizing the intermediate image by integrating the compensated image of the overlapping area,
    wherein the performing mesh-mapping comprises:
        detecting the outline of the object in one of the reference images;
        extracting the vertex in the detected outline by scanning the one of the reference images adjacent to the outline by a window having a predetermined size so that a single vertex exists in the window; and
        forming the mesh with respect to the one of the reference images based on the extracted vertex.

30. The computer-readable medium of claim 29, wherein each of the reference images is divided into a plurality of areas,
    wherein the mesh-mapping, the block-matching and the image-compensating are performed with respect to each of the areas to generate compensated images, each corresponding to the each of the areas, and
    wherein the image-synthesizing comprises integrating the compensated images.

31. The method in accordance with claim 1, wherein each of the reference images is divided into a plurality of areas,
    wherein the mesh-mapping, the block-matching and the image-compensating are performed with respect to each of the areas to generate compensated images, each corresponding to the each of the areas, and
    wherein the image-synthesizing comprises integrating the compensated images.

32. The device of claim 15, wherein each of the reference images is divided into a plurality of areas,
    wherein the extracting the vertex to construct the mesh, the block-matching and the compensating the image of the overlapping area are performed with respect to each of the areas to generate compensated images, each corresponding to the each of the areas, and
    wherein the image-synthesizing comprises integrating the compensated.

* * * * *